July 29, 1952 R. R. GILRUTH 2,605,063
AUTOMATIC SPRINGY TAB FOR AIRCRAFT CONTROL SURFACE
Filed May 22, 1945
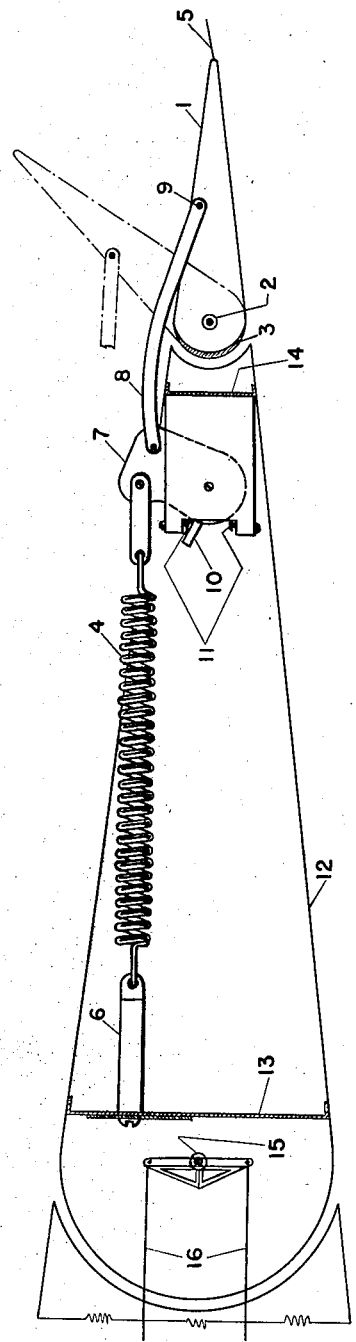
INVENTOR
ROBERT R. GILRUTH
BY Ralph L. Chappell
ATTORNEY Patented July 29, 1952

2,605,063

UNITED STATES PATENT OFFICE 2,605,063

AUTOMATIC SPRINGY TAB FOR AIRCRAFT CONTROL SURFACE

Robert R. Gilruth, Buckroe Beach, Va.

Application May 22, 1945, Serial No. 595,224

8 Claims. (Cl. 244—82)

(Granted under the act of March 3, 1883, as amended April 30, 1928; 370 O. G. 757)

This invention relates to an automatic springy tab for providing an automatic variation of control force with air speed.

It is known that certain forces must be applied to the controls of an aircraft to maintain steady flight at speeds other than that in which the plane is in trim for zero control force. This force generally decreases as the speed of the aircraft approaches trim speed.

A certain relationship between control force variation and air speed is desirable to insure satisfactory operation of the aircraft.

The purpose of this invention is to correct an undesirable force-speed relationship to approach the desirable relationship by utilizing an automatic springy tab with the control surface.

This springy tab is used in addition to the well known trim tabs or other trimming devices.

It will be apparent that if the automatic springy tab is deflected against the air stream by a predetermined spring force, its deflection will decrease as air speed increases to overcome the spring force. This results in an automatic variation in control force with air speed which approaches the desirable correction.

The device may be usefully applied to aircraft requiring correction of unsatisfactory variations of control forces with air speed whether on elevators, rudders, or ailerons. The device might also be used in the original design of an aircraft to provide adjustment of the force gradients to the values desired.

Details of the invention are set forth in the following drawing:

The figure is a diagrammatic view of the automatic springy tab in trim position connected to an elevator, also showing the extreme deflected position in dotted lines.

The drawing shows the automatic springy tab 1 suitably hinged at the outer edge of control surface 12 in any conventional manner. The control surface shown is that of an elevator. However, the tab might also be hinged to either a rudder or aileron without departing from the scope of the invention. Suitable controls 16 operate the control surface from the pilot's cabin.

As shown, elevator 12 is provided with front and rear spars 13 and 14 respectively and is pivoted about elevator hinge line 15. Springy tab 1 is pivoted to the elevator at hinge line 2.

Springy tab 1 is dynamically balanced about its hinge line. Mass 3 preferably of lead is incorporated into the tab as shown to obtain the necessary balance. Sub-tab 5 may be attached as shown.

A substantially constant spring force is utilized to deflect the tab against the air stream. Spring 4 is anchored at one end to the control surface in any suitable manner preferably to spar 13 by means of bar 6. The opposite end of the spring is connected to pivoted tab or idler 7 which in turn is connected to the springy tab by means of connecting arm or lever 8. Connection 9 between the arm and the tab is located beyond the tab hinge line so that a turning moment can be applied by the force of the spring.

Idler 7 is provided with lug 10 adapted to engage stops 11 to limit the extent of motion.

Any desired linkage or spring arrangement can be substituted without departing from the scope of the invention.

In operation spring 4 and arm 8 exert a turning moment within limits of the stops. The springy tab is thereby angularly deflected against the air stream. As the speed of the aircraft increases, the air force also increases tending to counteract the spring force and reduce the angular deflection of the springy tab till it finally assumes its trim position shown in the figure.

It will, therefore, be apparent that the angular deflection of the springy tab will affect the control force and the resulting correction of control force will automatically vary with airspeed.

The invention described herein may be manufactured and used by or for the Government of the United States of America for governmental purposes without the payment of any royalties thereon or therefor.

Having described my invention, I claim:

1. In an aircraft, a control surface, control means therefor, an automatically operated resiliently biased tab hinged to said control surface, spring means, said tab being deflected during flight into the airstream by said spring means which is independent of said control means and operatively connected between the control surface and the tab, said tab being pivotally movable wholly by pressure produced by the airstream and said spring means to vary the deflection of the tab during flight so that that the angular deflection of the tab will cause an automatic variation of control force with airspeed to correct any unsatisfactory variations of control forces due to the inherent asymmetry of said aircraft.

2. In an aircraft, a control surface, control means therefor, an automatically operated resiliently biased tab hinged to said surface, spring means, said tab being deflected during flight into the airstream by said spring means which is independent of said control means and operatively connected between the control surface and the tab by means of a linkage, said tab being pivotally movable in one direction wholly by pressure produced by the airstream and in the opposite direction by said spring means to vary the deflection of the tab during flight and said spring being of such strength that said tab is moved thereby a predetermined amount proportional to the speed of the airstream reacting on the tab so that the angular deflection of the tab will cause an automatic variation of control force with airspeed to correct any unsatisfactory variations of control forces due to the inherent asymmetry of said aircraft.

3. The combination set forth in claim 2 further defined in that stop means are provided to act on said linkage to limit the deflection of said tab against the airstream.

4. The combination of claim 1 further defined in that the said tab is dynamically balanced about its hinge line.

5. In an aircraft, a control surface, control means therefor, an automatically operated resiliently biased tab hinged to said control means, means for applying a predetermined yielding force to said tab to pivotally deflect the tab into the airstream during flight, said means being connected to the tab and applying the only pivotal deflecting force to the tab other than the force produced by the airstream during flight, said predetermined yielding force being of such size that angular deflection will be varied proportionately to the speed of the aircraft by the force produced by the airstream.

6. The combination of claim 5 further defined in that means for applying the predetermined yielding force is secured to the control surface and connected to the tab.

7. In an aircraft, a control surface, control means therefor, an autmatically operated resiliently biased tab hinged to said control surface, means for applying a predetermined yielding force to said tab to pivotally deflect the tab into the airstream during flight, said means being connected to the tab and applying the only pivotal deflecting force to the tab other than the force produced by the airstream during flight, said predetermined yielding force being of such size that angular deflection will be varied in predetermined and definite amounts proportionately to the speed of the aircraft by the force produced by the airstream.

8. In an aircraft, a control surface, control means therefor, an automatically operated resiliently biased tab hinged to said control surface, means for applying a predetermined yielding force to said tab to pivotally deflect the tab into the airstream during flight, said means being connected to the tab and applying the only pivotal deflecting force to the tab other than the force produced by the airstream during flight, said means being of said size which will yield to forces of the airstream on the tab within the range of speeds of the aircraft.

ROBERT R. GILRUTH.

REFERENCES CITED

The following references are of record in the file of this patent:

UNITED STATES PATENTS

| Number | Name | Date |
|---|---|---|
| 1,083,464 | Roche | Jan. 6, 1914 |
| 1,864,996 | Gerhardt | June 28, 1932 |
| 2,049,188 | Alfaro | July 28, 1936 |
| 2,057,877 | Bragunier | Oct. 20, 1936 |
| 2,081,957 | Roche | June 1, 1937 |
| 2,147,638 | De Port | Feb. 21, 1939 |
| 2,357,465 | Focht | Sept. 5, 1944 |
| 2,438,309 | Zimmerman | Mar. 23, 1948 |

FOREIGN PATENTS

| Number | Country | Date |
|---|---|---|
| 375,900 | Italy | Oct. 25, 1939 |
| 100,266 | Sweden | Sept. 12, 1940 |